US007399794B2

(12) United States Patent
Harmon et al.

(10) Patent No.: US 7,399,794 B2
(45) Date of Patent: Jul. 15, 2008

(54) POLYMER/CARBON NANOTUBE COMPOSITES, METHODS OF USE AND METHODS OF SYNTHESIS THEREOF

(75) Inventors: Julie P. Harmon, Tampa, FL (US); LaNetra M. Clayton, Plant City, FL (US)

(73) Assignee: University of South Florida, Tampa, FL (US)

( * ) Notice: Subject to any disclaimer, the term of this patent is extended or adjusted under 35 U.S.C. 154(b) by 249 days.

(21) Appl. No.: 11/117,592

(22) Filed: Apr. 28, 2005

(65) Prior Publication Data

US 2005/0245667 A1 Nov. 3, 2005

Related U.S. Application Data

(60) Provisional application No. 60/565,917, filed on Apr. 28, 2004.

(51) Int. Cl.
*C08F 2/42* (2006.01)
*B60C 1/00* (2006.01)
*C08F 2/46* (2006.01)

(52) U.S. Cl. .................. 522/161; 522/157; 522/70; 264/405; 524/495; 524/496; 204/157.15

(58) Field of Classification Search .............. 522/157, 522/158, 161, 70; 204/157.15; 524/495, 524/496; 264/405, 442, 488
See application file for complete search history.

(56) References Cited

U.S. PATENT DOCUMENTS

| 6,057,637 A | 5/2000 | Zettl et al. | |
|---|---|---|---|
| 6,599,961 B1 | 7/2003 | Pienkowski et al. | |
| 2003/0158323 A1* | 8/2003 | Connell et al. | 524/495 |
| 2006/0054488 A1* | 3/2006 | Harmon et al. | 204/157.15 |

FOREIGN PATENT DOCUMENTS

| JP | 2001011344 | 1/2001 |
|---|---|---|
| WO | WO 03/080513 | 2/2003 |

OTHER PUBLICATIONS

Abdo A. E. et al. "Natural Fibre High-Density Polyethylene and Lead Oxide Composites for Radiation Shielding", *Rad. Phys. and Chem.*, 2003, pp. 185-195, vol. 66.

Andrews, R. et al. "Nanotube Composite Carbon Fibers", *Applied Physics Letters*, 1999, pp. 1329-1331, vol. 75.
Beuneu, F. et al. "Modification of Multiwall Carbon Nanotubes by Election Irradiation: An ESR Study", *Physical Review B*, Feb. 15, 1999, pp. 5945-5948, vol. 59.
Bhattacharyya, A. R. et al. "Crystallization and Orientation Studies in Polypropylene/Single Wall Carbon Nanotube Composite", *Polymer*, 2003, pp. 2373-2377, vol. 44.
Biagtan E. et al. "Polymer Scintillators: Continuous Versus Intermittent Gamma Irradiation Effects", *Optical Polymers Fibers and Waveguides*, 2001, pp. 221-230, ACS Symposium Series 795, American Chemical Society, Washington, DC.
Bower, C. et al. "Deformation of Carbon Nanotubes in Nanotube-Polymer Composites" *Applied Physics Letters*, May 31, 1999, pp. 3317-3319, vol. 74, No. 22.
Cadek, M. et al. "Reinforcement of Polymers with Carbon Nanotubes: The Role of Nanotube Surface Area", *Nano Letters*, 2004, pp. 353-356, vol. 4.
Choy et al. "Mechanical Relaxations in Polybutene-1 and Poly-4-Methylpentene-1", *Polymer*, 1981, pp. 534-548, vol. 22.
Clayton, L. M. et al. "Processing of Transparent Polymer Nanotube Composites Via Heat, UV Radiation and Ionizing (gamma) Radiation Using Ultrasonication and Solvent Dissolution" *Materials Research Society Symposia Proceedings*, 2003, pp. M2.4.1-M2.4.9, vol. 772.
Clayton, L. M. et al. "Transparent Poly(methyl methacrylate)/Single-walled Carbon Nanotube (PMMA/SWNT) Composite Films with Increased Dielectric Constants" *Advanced Functional Materials*, 2005, pp. 101-106, vol. 15.
Clayton, L. M. et al. "Gamma Radiation Effects on the Glass Transition Temperature and Mechanical Properties of PMMA/soot Nanocomposites", *Polymer Bulletin*, 2004, pp. 259-266, vol. 52.
Clough, R. et al. "High-Energy Radiation And Polymers: A Review Of Commercial Processes And Emerging Applications" *Nuclear Instruments and Methods Phys. Res B*, 2001, pp. 8-33, vol. 185.
Clough, R. et al. "Radiation Resistance of Polymers and Composites" in *Irradiation Effects on Polymers*, Eds. D. W. Clegg and A. A. Collyer, Elsevier Applied Science, New York, 1991, pp. 79-156.

(Continued)

*Primary Examiner*—Sanza L. McClendon
(74) *Attorney, Agent, or Firm*—Saliwanchik, Lloyd & Saliwanchik

(57) ABSTRACT

Novel transparent composites composed of single wall carbon nanotubes incorporated into the matrix of a polymer are utilized in services wherein the composites are exposed to ionizing radiation, including galactic cosmic radiation. Accordingly, the composites are useful in deep space applications like space vehicles, space stations, personal equipment as well as applications in the biomedical arts and atom splitting research. The composites can be modified with organic dyes containing at least one phenyl ring and the resulting doped composite is useful as a radiation detector. The preferred polymer is poly(4-methyl-1-pentene).

26 Claims, 16 Drawing Sheets

OTHER PUBLICATIONS

Cucinotta, F. A. et al. "Space Radiation Cancer Risks and Uncertainties for Mars Missions", *Rad. Res.*, 2001, pp. 682-688, vol. 156.

Emran, S. K. "Viscoelastic Properties and Phase Behavior of 12-*tert*-Butyl Ester Dendrimer/Poly(methylmethacrylate) Blends", *J. Polymer Science: Part B: Polymer Physics*, 2001, pp. 1381-1393, vol. 39.

Gao, H., et al. "Para—Substituted Polystyrenes: Stress Relaxation, Creep, Dynamic Mechanical and Dielectric Analyses", *Thermochimica Acta*, 1996, pp. 85-102, vol. 284.

Grimes, C. A. et al. "The 500 MHz to 5.50 GHz Complex Permittivity Spectra of Single-Wall Carbon Nanotube-Loaded Polymer Composites" *Chemical Physics Letters*, Mar. 24, 2000, pp. 460-464, vol. 319.

Goodhead, D. T. "ESR Study of Radiation Damage in TPX Polymer (Poly-4- Methylpentene-1 I)", *J. Polym. Sci.*, Part A-2, 1971, pp. 999-1024, vol. 9.

Hamon, M. A. et al. "Dissolution of Single-Walled Carbon Nanotubes" *Advanced Materials*, 1999, pp. 834-840, vol. 11.

Haggenmueller, R. et al. "Aligned Single-Wall Carbon Nanotubes In Composites By Melt Processing Methods", *Chemical Physics Letters*, 2000, pp. 219-225, vol. 330.

Harmon, J. P. et al. "Ionizing Radiation Effects on Interfaces in Carbon Nanotube- Polymer Composites", *Materials Research Society Symposium Proceedings Fall*, 2002, pp. P9.7.1-P9.7.11, vol. 697.

Higgenbotham-Bertolucci, P. R. et al. "Creep and Stress Relaxation in Methacrylate Polymers: Two Mechanisms of Relaxation Behavior Across the Glass Transition Region" *Polymer Engineering and Science*, May 2001, pp. 873-880, vol. 41.

Hill, D. E. et al. "Functionalization of Carbon Nanotubes with Polystyrene", *Macromolecules*, 2002, pp. 9466-9471, vol. 35.

Hwang, G. L. et al. "Breakage, Fusion, and Healing of Carbon Nanotubes" *Nano Letters*, Jul. 18, 2001, pp. 435-438, vol. 1.

Jia, Z. et al. "Study on Poly(methyl methacrylate)/Carbon Nanotube Composites" *Materials Science & Engineeering*, 1999, pp. 395-400, vol. A271.

Jin, C.-W. et al. "Interaction Of Fullerenes And Carbon Nanotubes With Diatomic Molecules", *Synthetic Metals*, 2001, pp. 1221-1222, vol. 121.

Jin, L. et al. "Alignment of Carbon Nanotubes in a Polymer Matrix by Mechanical Stretching" *Applied Physics Letters*, Aug. 31, 1998, pp. 1197-1199, vol. 73.

Jin, Z. et al. "Nonlinear Optical Properties of Some Polymer/Multi-walled Carbon Nanotube Composites" *Chemical Physics Letters*, 2000, pp. 505-510, vol. 318.

Kim, M. Y. et al. "Performance of Polymeric Materials and Shielding for Cosmic Radiation" in *Irradiation of Polymers Fundamentals and Technological Applications*, Eds. R. L. Clough and S.W. Shalaby, ACS Symposium Series, 620 (1996) 350-362.

Koshio, A. et al. "A Simple Way to Chemically React Single-Wall Carbon Nanotubes with Organic Materials Using Ultrasonication" *Nano Letters*, 2001, pp. 361-363, vol. 1.

Krasheninnikov, A. V. et al. "Formation of Ion-Irradiation-Induced Atomic-Scale Defects on Walls of Carbon Nanotubes" *Physical Review B*, 2001, pp. 245405-1 to 245405-6, vol. 63.

Lai, J. Y. et al. "Preparation of Vinylpyridine Irradiation-Grafted Poly(4-Methyl-Pentene-1) Membrane for Oxygen Enrichment", *Journal of Applied Polymer Science*, 1986, pp. 5763-5775, vol. 32.

Lillehei, P. T. et al. "Imaging Carbon Nanotubes in High Performance Polymer Composites via Magnetic Force Microscopy", *Nano Letters*, 2002, pp. 827-829, vol. 2.

McCarthy, B. et al. "Observation of Site Selective Binding in a Polymer Nanotube Composite" *Journal of Materials Science Letters*, 2000, pp. 2239-2241, vol. 19.

Miyoshi et al. "Slow Chain Dynamics in *Isotactic*-poly(4-methyl-1-pentene) Crystallites Near the Glass Transition Temperature Characterized by Solid-State $^{13}$C MAS Exchange NMR" *Macromolecules*, 2004, pp. 6460-6471, vol. 37.

Niyogi, S. et al. "Chromatographic Purification of Soluble Single-Walled Carbon Nanotubes (s-SWNTs)" *J. Am. Chem. Soc.*, Jan. 9, 2001, pp. 733-734, vol. 123.

Odegard, G. M. et al. "Constitutive Modeling of Nanotube-Reinforced Polymer Composites", *NASA/TM*, 2001-211044, pp. 1-13.

Ounaies et al. "Electrical Properties of Single Wall Carbon Nanotube Reinforced Polyimide Composites", *Composites Science and Technologies*, 2003, pp. 1637-1647, vol. 63.

Park, C. et al. "Dispersion of Single Wall Carbon Nanotubes by In Situ Polymerization Under Sonication" *Chem. Phys. Letters*, 2002, pp. 303-308, vol. 364.

Park, H. et al. "Sonochemical Syntheses and Catalytic Properties of Oxide and Carbide Nanocomposites on Carbon Nanotubes", *Chemistry Letters*, 2005, 222-224, vol. 34.

Penn, R. W. et al. "Frequency and Temperature Dependence of the Dynamic Mechanical Properties of Poly-4-Methylpentene-1", *Journal of Polymer Science: Part A-2*, 1966, pp. 559-569, vol. 4.

Platzer, N. A. J. "Preface" to *Irradiation of Polymers, Advances in Chemistry*, ACS Symposium Series, Gould, R. Ed. 1967, pp. vii-xii, vol. 66.

Qian, D. et al. "Load Transfer and Deformation Mechanisms in Carbon Nanotube- Polystyrene Composites", *Applied Physics Letters*, 2000, p. 2868-2770, vol. 76.

Reddy, S. et al. "Structure and Temperature-Dependent Properties of Poly(4-methyl-1-pentene) Fibers", *Macromolecules*, 1997, pp. 3293-3301, vol. 30.

Ruan, S. L. et al. "Toughening High Performance Ultrahigh Molecular Weight Polyethylene Using Multiwalled Carbon Nanotubes", *Polymer*, 2003, pp. 5643-5654, vol. 44.

Ryan, K. P. et al. "Carbon-Nanotubes Nucleated Crystallinity in a conjugated Polymer Based Composite", *Chemical Physics Letters*, 2004, pp. 329-333, vol. 391.

Salvetat, J.-P. et al. "Elastic and Shear Moduli of Single-Walled Carbon Nanotube Ropes", *Physic. Rev. Letters*, 1999, pp. 944.

Sandler, J. et al. "Development of a Dispersion Process for Carbon Nanotubes in an Epoxy Matrix and the Resulting Electrical Properties", *Polymer*, 1999, pp. 5967-5571, vol. 40.

Schadler, L. S. et al. "Load Transfer in Carbon Nanotube Epoxy Composites" *Applied Physics Letters*, Dec. 28, 1998, pp. 3842-3844, vol. 73.

Shaffer, M. S. P. et al. "Fabrication and Characterization of Carbon Nanotube/Poly(vinyl alcohol) Composites", *Materials*, 1999, pp. 395-399, vol. 271.

Siochi et al. "Design and Characterization of Caron Nanotube Composites", *Advanced Materials and Processing Branch, NASA*, 2003, Langley Research Center, Hampton, VA.

Smith, B. et al. "Knock-on Damage in Single Wall Carbon Nanotubes by Electron Irradiation", *Electronic Properties of Novel Materials-Science and Technology of Molecular Nanostructures*, 1999, pp. 360-363.

Star, A. et al. "Dispersion and Solubilization of Single-Walled Carbon Nanotubes with a Hyperbranched Polymer", *Macromolecules*, 2002, pp. 7516-7520, vol. 35.

Starkweather, H. W. et al. "Conductivity and the Electric Modulus in Polymers", *Journal of Polymer Science: Part B: Polymer Physics*, 1981, pp. 637-641, vol. 30.

Stéphan, C. et al. "Characterization of Singlewalled Carbon Nanotubes-PMMA Composites" *Synthetic Metals*, 2000, pp. 139-149, vol. 108.

Tait, P.J.T. et al. "Polymerization of 4-Methylpentene-1 with Magnesium-Chloride-Supported Catalysts", *Advances in Polyolefins*, pp. 309-321, (R.B. Seymour and T. Cheng, eds. Plenum Press) (1987).

Tang, B. Z. et al. "Preparation, Alignment, and Optical Properties of Soluble Poly(phenylacetylene)-Wrapped Carbon Nanotube", *Macromolecules*, 1999, pp. 2569-2576, vol. 31.

Tatro, S. R. et al. "Probing Multi-walled Nanotube/Poly(methyl methacrylate) Composites with Ionizing Radiation", *Polymer*, 2004, pp. 1971-1979, vol. 45.

Wilson, J. W. et al. "Galactic and Solar Cosmic Ray Shielding in Deep Space", *NASA Technical Paper* 3682, Dec. 1997.

Woodard, A. E. et al. "Dynamic Mechanical Behavior of Some Partially Crystalline Poly-α-olefins", *Journal of Polymer Science*, 1961, pp. 117-125, vol. L.

Zeitlin, C. et al. "The Fragmentation of 510 MeV/Nuclear Iron-56 in Polyethylene. II. Comparisons Between Data and a Model" *Radiation Research*, 1996, pp. 666-672, vol. 145.

\* cited by examiner

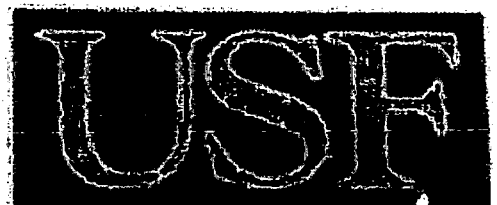 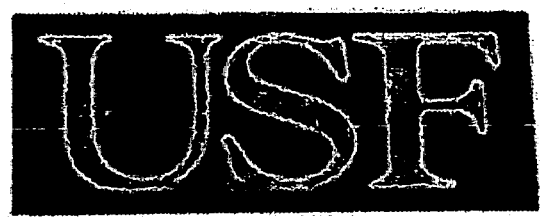
PMP/SWNT composite film
Pure PMP film
FIG. 2

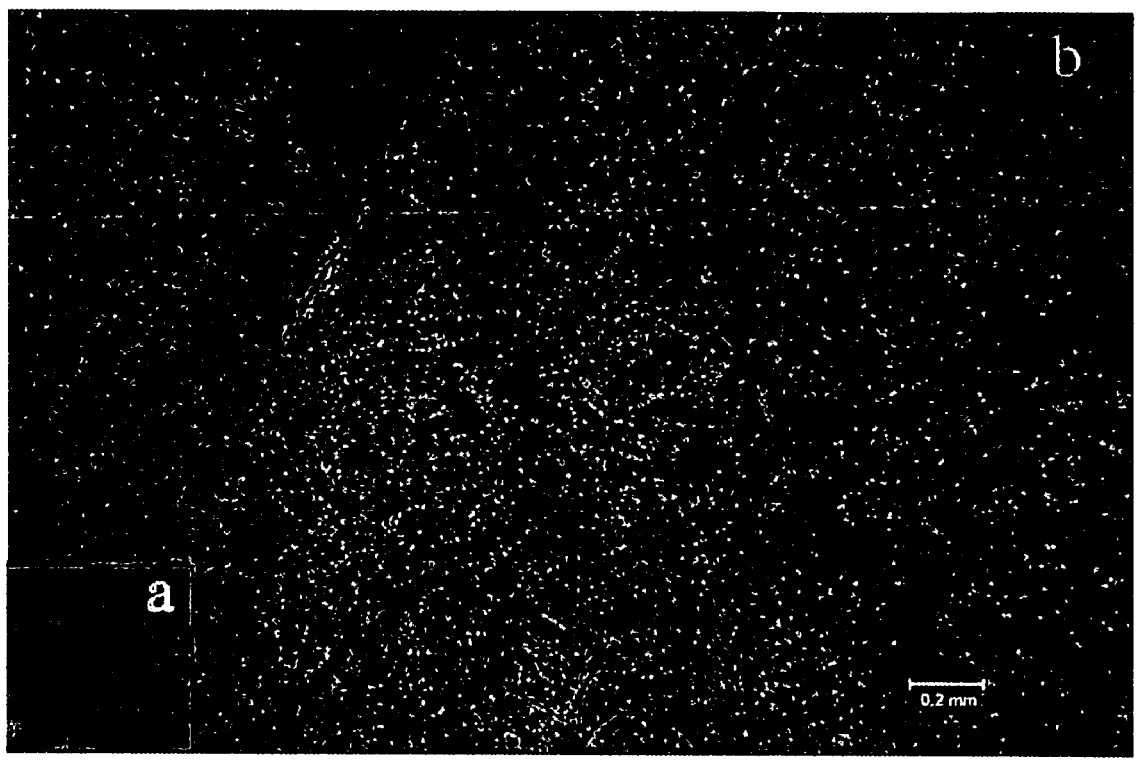
FIG. 8A                    FIG. 8B

POLYMER/CARBON NANOTUBE COMPOSITES, METHODS OF USE AND METHODS OF SYNTHESIS THEREOF

CROSS-REFERENCE TO A RELATED APPLICATION

This application claims the benefit of U.S. Provisional Application Ser. No. 60/565,917, filed Apr. 28, 2004, the disclosure of which is incorporated herein by reference in its entirety.

FIELD OF THE INVENTION

The subject invention relates to the field of optoelectronics.

BACKGROUND OF THE INVENTION

In the development of solutions for reducing the radiation risks associated with manned space flight, radiation shielding materials have been developed to protect personnel and equipment from the damaging effects of radiation, including galactic cosmic radiation (GCR). Polyethylene (PE) is a favorable material because it exhibits many high performance properties (i.e., strength, thermal, and optical). However, the use of PE is limited to low temperature applications and to those applications wherein visibility through the polymer is not required, because PE is an opaque polymer.

The incorporation of carbon nanotubes (CNTs) into polymer matrices has resulted in composites that exhibit increased thermal stability, modulus, strength, electrical and optical properties (Shaffer et al. 1999; Jin et al. 2001; Haggenmueller et al. 2000; Jia et. al 1999; Ounaies et al. 2003, Park et al. 2005, Tatro et al. 2004; Siochi et al. 2003; Clayton et al. 2005). Several investigations have concluded that carbon nanotubes can also act as a nucleating agents for polymer crystallization (Ryan et al. 2004; Cadek et al. 2004, Ruan et al. 2003).

Various processing techniques have been employed to uniformly disperse the nanotubes in an attempt to increase interaction at the polymer/nanotube interface (Shaffer et al. 1999; Jin et al. 2001; Haggenmueller et al. 2000; Ounaies et al. 2003, Park et al. 2005, Tatro et al. 2004; Siochi et al. 2003; Clayton et al. 2005).

SUMMARY OF THE INVENTION

In the embodiment, the subject invention provides a transparent polymer composites with radiation resistant qualities. Another embodiment of the subject invention provides methods of fabrication of radiation resistant polymer composite. Yet other embodiments of the subject invention provide methods of using the polymer composites as a deep space shielding material, and the subject methods can also include methods of using the polymer composite in various radiation prone environments on Earth, and in space, including service on other planets or moons. In certain embodiments, the subject invention provides composites with improved optical properties. Specifically, certain composites of the subject invention maintain transparency when exposed to radiation and, accordingly, are useful in applications wherein visibility is paramount.

BRIEF DESCRIPTION OF THE DRAWINGS

FIG. 2 depicts optical photographs of transparent PMP/CNT films.

FIG. 8(a) illustrates an optical micrograph of neat PMP. The magnification is 10×0.3.

FIG. 8(b) illustrates an optical micrograph of a 0.5% PMP/single wall carbon nanotube composite. The magnification is 10×0.3.

DETAILED DESCRIPTION OF THE INVENTION

Figure 1:
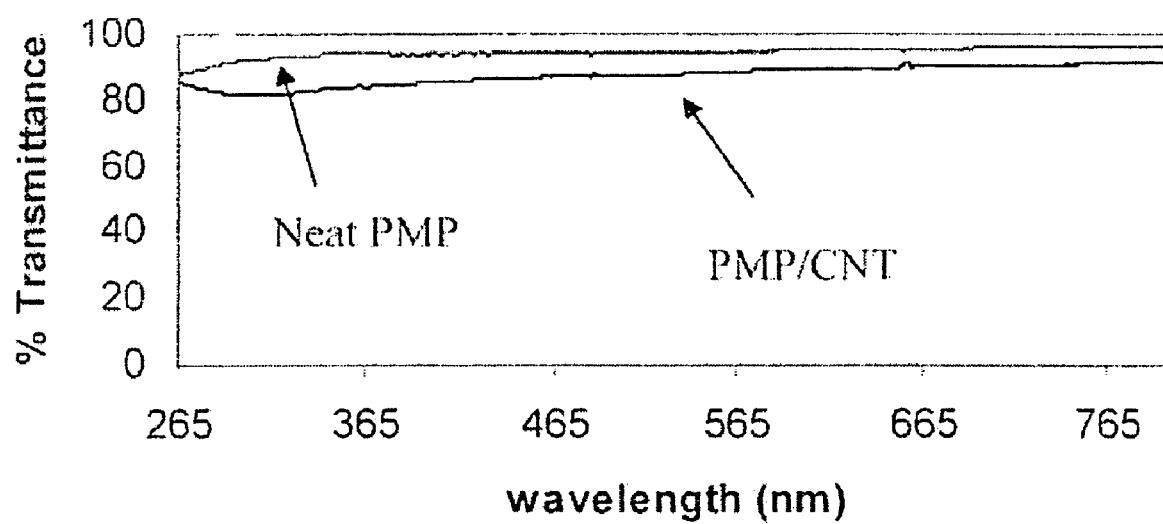
FIG. 1 shows the UV-VIS data of the neat 4-methyl-1-pentene (PMP) and a PMP/CNT composite.

In the following detailed description of various embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

One aspect of the subject invention is directed to a unique polymer nanocomposite technology. Polymers exhibiting high potential for shielding galactic cosmic radiation (GCR) were processed into composites while enabling a high level of processability for integrating the composites into apparatus exposed to ionizing radiation, including GCR, when in use. Thus, the composites can be processed into, for example and without limitation, spacecraft, manned space vehicles, spacesuits, and manned planetary terrestrial living quarters.

The composites of the subject invention comprise carbon nanotubes, which are incorporated into the matrix of a polymer. Specifically, the carbon nanotubes are single wall carbon nanotubes. Carbon nanotubes are 100 times stronger than steel, exhibit excellent electrical and mechanical strength, and are light in weight. Due to their weight, CNTs are thought to be ideal fillers in the PMP matrix in order to produce a composite with GCR resistant properties, as well as with enhanced electrical and mechanical properties. Materials that are light in weight are better in resisting GCR and limiting secondary radiation.

The nanotube concentration in the polymer is between about 0.1% and about 10%. More preferably, the nanotube concentration is between about 0.1% and about 5%. Most preferably, the nanotube concentration is about 0.5%. The nanotube concentration can be adjusted by mixing heat melted polymer with the polymer/CNT composite in a mixer.

In one embodiment, the polymer consists of carbon and hydrogen only. The polymer also exhibits solubility in organic solvents. Preferably, the solvents are cyclohexane and cyclohexene. The melting point temperatures of the polymer are preferably within the range of 200° C. and 400° C. Preferably, the temperature range is within about 225° C. and about 275° C. Also, to obtain transparent composites, the polymer should be transparent in the visible region of the Electromagnetic Spectrum. FIG. 2 illustrates the transparency of one embodiment of the transparent polymer/SWNT composite.

FIGS. 1-6 all illustrate various properties of the PMP/single wall carbon nanotube specific embodiment.

Advantageously, PMP, a linear hydrocarbon, exhibits superior strength, thermal, and optical properties when compared to polyethylene (PE), a polymer commonly used in current space applications. The isotatic form of this polymer is highly crystalline, yet is optically transparent as a result of having a crystalline phase with a lower density (0.828 g/cm$^3$) than the amorphous phase (0.838 g/cm$^3$) (Lopez et. al 1992). Specifically, PMP dissolves in a variety of solvents including cyclohexyl chloride, cyclohexane and cyclohexene. PMP has a much broader temperature use range than PE because it has a melt temperature, $T_m$, of around 235° C.-245° C. as compared to that of 136° C. for PE. Accordingly, the thermal properties of PMP extend the temperature range for shielding materials. The tensile strength of high density PE is 21-38 MPa, while that of PMP is 23-28 MPa. The tensile modulus of high density PE is 0.41-1.24 GPa. For PMP tensile moduli are reported in the range from 0.8 to 1.2 GPa. The skilled artisan would understand that these are representative values under similar test conditions. Sample preparation, annealing, and any additives will affect these properties. Advantageously, PMP is transparent in the visible region of Electromagnetic Spectrum; PE is not.

The polymers of the subject invention can be modifying by doping with an organic dye, which has at least one phenyl ring.

The field of optoelectronics could also benefit from the incorporation of carbon nanotubes in PMP. The fabrication of a polymer-nanotube composite with enhanced electrical properties while limiting the loss of transparency would serve many applications where these properties are needed, such as electrostatic charge dissipation (ESD) (static control) in which the goal is to increase electrical conductivity while limiting the loss of transparency. ESD is beneficial in clean rooms, offices and laboratories, assembly processes, and much more. GE also custom designs plastics where ESD is needed.

Another aspect of the subject invention is directed to methods of preparing the polymer/CNT composites. The composites can be prepared by dissolving the polymer in a solvent and sonicating the CNTs in a separate sample of a second solvent. Preferably, the first solvent and the second solvent are the same. Preferably, the solvent is a halogenated hydrocarbon. More preferably, the halogenated hydrocarbon is cyclohexyl chloride. Optionally, the CNTs can be pretreated with polar solvent, for example, N,N-dimethyl formamide (DMF) or chlorobenzene. To disperse the CNTs throughout the polymer, the sonicated CNT solution is mixed with the polymer solution and sonicated. If the polymer falls out of solution at room temperature, it may be necessary to perform these steps with the solvent heated to and maintained at an elevated temperature. Preferably, the elevated temperature is within the range of about 70° C. and 110° C. More preferably, the elevated temperature is at about 90° C. The resulting polymer/CNT solution can be spun coated onto a device to apply a radiation resistant coating. Optionally, the resulting polymer/CNT solution can be heated and molded into a device that is used in an environment that is exposed to ionizing radiation.

Yet another aspect of the subject invention is directed to methods of using the composites. Because of the composites' ability to resist ionizing radiation, an apparatus that is exposed to radiation when in use can be composed at sufficient amount of the composite to resist radiation. Preferably, the composite is found on the surface of the apparatus. The subject composites can be applied as a coating on the outer surface of the apparatus. The composite optionally can be molded into an end-use equipment, for example, where it would become a structural part of the apparatus.

As noted above, the polymer can be doped with an organic dye having at least one phenyl ring. Composites prepared with doped polymers are useful in thermoluminescent detection. High energy particles and radiation excite π electrons in the phenyl rings of the organic dyes; photons are emitted when the electronics relax to the ground state. These photons can be transported to photodetectors and counted. In this way, the radiation environment of the shielding materials can be continuously monitored. Thus, the composites of the subject invention can be used to monitor ionizing radiation.

As used in this specification and the appended claims, the singular forms "a", "an", and "the" include plural reference unless the context clearly dictates otherwise. Thus, for example, a reference to "a composite" includes more than one such composite, a reference to "the method" can include more than one method, and the like.

The terms "comprising", "consisting of", and "consisting essentially of" are defined according to their standard meaning and may be substituted for one another throughout the instant application in order to attach the specific meaning associated with each term.

As used herein, the term "CNT" refers to carbon nanotubes or a carbon nanotube.

As used herein, the term "SWNT" refers to a single wall carbon nanotube or single wall carbon nanotubes.

As used herein, the term "PMP" refers to the polymer poly(4-methyl-1-pentene) and is interchangeably with "P4M1P".

Materials and Methods

The poly (4 methyl-1-pentene) and cyclohexyl chloride solvent were purchased from Sigma Aldrich (Milwaukee, Wis.). The N,N-dimethylformamide solvent was obtained from Fisher Scientific (Pittsburgh, Pa.). Purified laser ablated single-walled carbon nanotubes (SWNT) were provided by the Center for Nanotechnology/NASA Ames Corporation (Moffett Field, Calif.).

Dynamic Mechanical Analysis

The viscoelastic properties were collected on a TA Instruments 2980 Dynamic Mechanical Analyzer (DMA). The mode was set to measure a tension film from frequencies ranging from 1 to 100 Hz with an amplitude of 5 microns. The average sample size was 14.4×5.8×1.3 mm. Because measurements are time, temperature and frequency dependent a temperature range was taken from −150° C. to 300° C.

Microhardness

The Vickers hardness number (HV) for each sample was determined with a Leica VMHT MOT with a Vickers indenter. The values were taken from the average of four indents. A horizontal and a vertical reading were taken on each indent. A load of 500 g and a dwell time of 20 s were used. HV values were expressed in MPa by multiplying by 9.807.

Differential Scanning Calorimetry

Melt temperatures ($T_m$) and percent crystallinity were obtained on a TA Instruments 2920 DSC. A sample amount between 2-10 mg was obtained from the compression molded sample. The samples were heated to 300° C. at a rate of 5° C. per minute to insure that all samples had the same thermal history. The sample was cooled with liquid nitrogen to room temperature and reheated to 300° C. The $T_m$ and percent crystallinity values were taken from the second heat. Percent crystallinity values were calculated based on a 100% crystalline polymer with a heat of fusion of 61.7 J/g (Zoller et al. 1986; Miyoshi et al. 2004; Reddy et al. 1997).

a) Differential Scanning Calorimetry (DSC): A TA Instruments 2920 DSC is used to scan 5 mg samples at a rate of 3° C./min. Glass transition temperatures and melting points are determined.

b) Dynamic Mechanical Analysis (DMA): Rectangular samples 3.0 cm×0.5 cm×0.1 cm is compression molded. Shear and tensile moduli is recorded on a TA Instruments DMA 2980 at different frequencies from −150° C. to temperatures at which the samples are unable to bear loads. This defines the use temperature for the materials. An increase in moduli and glass transitions temperatures accompanies SWNT incorporation.

c) Dielectric Analysis (DEA): Disks are compression molded and scanned in a TA Instruments 2970 DEA. The real and imaginary components of the dielectric constant are determined. A standard analysis of viscoelastic properties ensues. Neat PMP and neat PE are not dielectrically active. Composites are tested via DEA.

d) UV Visible Spectroscopy and Transparency: Samples are compression molded in 1 cm diameter disk molds with a thickness of 0.5 cm. Ferrotyping plates will be used on each side of the mold to ensure optical surfaces. Transmission spectra are recorded with an 8452A Hewlett-Packard UV/Visible Spectrophotometer. Neat PMP and low concentration SWNT composites are studied. PE is opaque.

e) Refractive Index: An Abbè Refractometer equipped with a solid sample assembly will be used to determine the refractive indexes of any transparent samples. The incorporation of nanotubes should increase the refractive index of the systems due to incorporation of aromatic moieties.

f) Conductivity: Thin films of the polymer/nanotube composite are spun coat using a Chemat Tech Spin Coater, KW-4A. A four point probe is used to measure the conductivity of the thin films.

g) Tensile Modulus and Tensile Strength: Dog-bone shaped samples are compression molded. A Q-Test Universal Tester is used to determine the modulus and strength of the samples. Samples are deformed at a cross head speed of 0.5 inch/min.

h) Microhardness: A Leica VMHT MOT with a Vickers indenter is used to determine the Vickers hardness number (HV). Four indentations are made on each sample using a load of 500 g and a dwell time of 20 s. The Vickers hardness number is based on the average diagonal length of an imprint made from the indentor. Both the horizontal and vertical diagonal lengths are measured for each indentation. The values reported are an average of these eight measurements.

i) Fourier Transform Infrared Spectroscopy (FTIR): A Nicolet Magna 500 FTIR is used to characterize the PMP synthesized in-house and by Phillips. The symmetric stretching in carbon nanotubes does not give rise to IR absorption bands.

j) Nuclear Magnetic Resonance is used to monitor PMP purity and stereoregularity via a Bruker DPX 250 instrument.

k) Scanning Electron Microscopy (SEM): A Hitachi S-800 Field Emission HRSEM is used to characterize the molded surfaces and fracture surfaces of the nanotube/polymer composites in order to monitor dispersion.

l) Transmission Electron Microscopy (TEM): Phillips FEI Transmission Electron Microscope is used to characterize dispersion of the nanotubes at higher magnifications than those obtained with SEM.

EXAMPLE 1

Single-Walled Carbon Nanotube Preparation

Raw laser ablation material provided by NASA Johnson Space Center was purified as described elsewhere (Liu, J. et al. (1998) "Fullerene Pipes", *Science.* 280(5367):1253-1256.). The raw nanotubes were refluxed in 2.6 M nitric acid for approximately 160 hours and then diluted with double distilled water. This solution was then centrifuged (4000 rpm), the solvent mixture decanted, and the sample was again suspended in double distilled water. This step was repeated two more times in order to remove the acid from the nanotubes. Finally, the solution was filtered through a cellulose nitrate filter and died at 60° C. in a vacuum oven to form a buckypaper.

Polymer/Nanotube Composite Synthesis

Commercial low molecular weight poly (4-methyl-1-pentene) with a measured $T_m$ of 235° C. was dissolved in cyclohexyl chloride at 110° C. to make a 3.5% solution. Laser ablated SWNTs were sonicated in N,N-dimethylformamide (DMF) using a Branson Sonifer 450 for 1 hour. The nanotube/DMF dispersion was placed in a vacuum oven at 80° C. to remove the solvent. The DMF treated nanotube paper was then dispersed in cyclohexyl chloride via sonication for 6 hours. The nanotube/solvent mixture was added to the polymer solution and sonicated together for 1 hour. The polymer/nanotube/cyclohexyl chloride mixture was placed in a warm beaker lined with teflon film and the solvent was allowed to evaporate at room temperature for 12 hours, and then placed in a vacuum oven at 80° C. to remove any residual solvent. The dried composite with 0.5% (by wt) of SWNTs was compression molded for analysis. Pieces were placed between KAPTON film and stainless steel plates and pressed for 5 minutes at 5000 pounds of pressure at a temperature of 246° C. Neat PMP was prepared in the same manner. After processing, the measured $T_m$ for the neat and composite sample was 235° C.

Sample Characterization

Ultraviolet-visible spectra were recorded with an Agilent Technologies 8453 UV-VIS Diode Array spectrophotometer. A glass slide served as the blank. FIG. 1 shows the UV-VIS data of the neat 4-methyl-1-pentene (PMP) and PMP/CNT composite.

Figure 3:
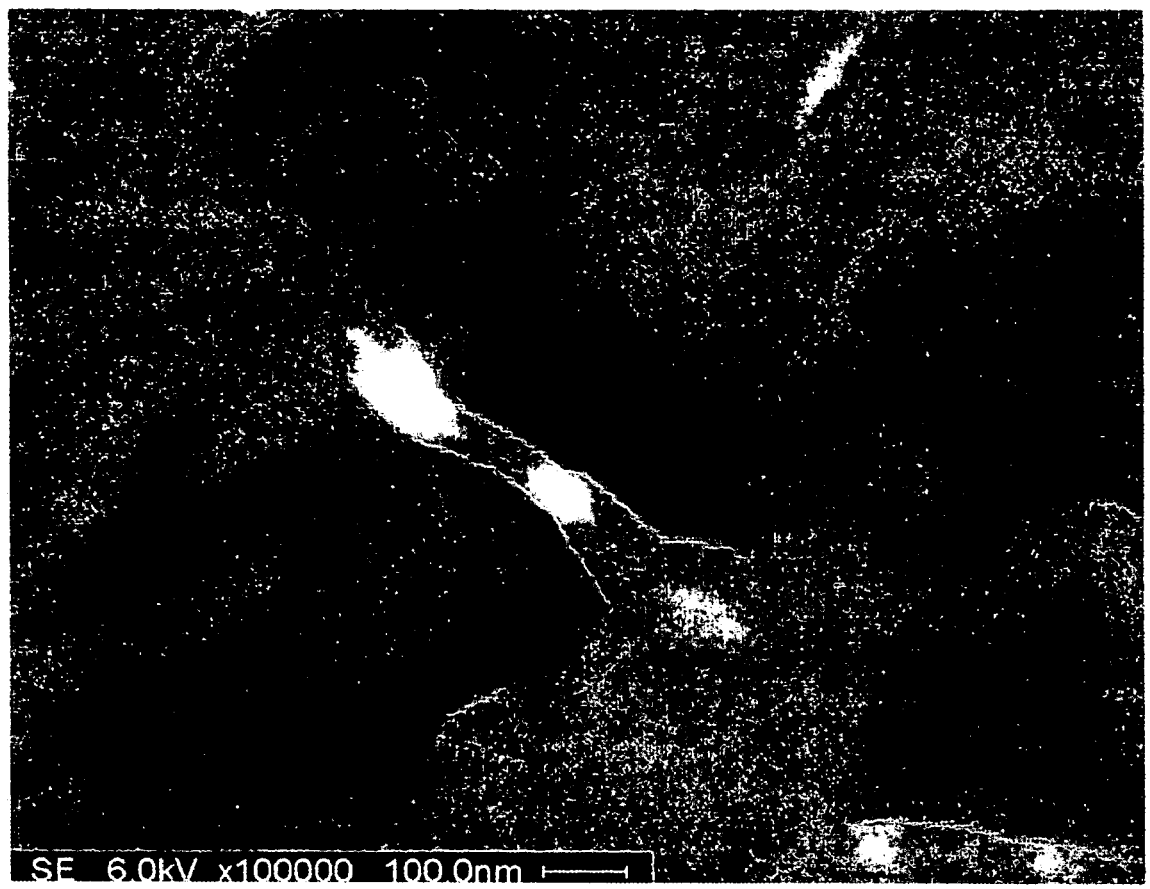
FIG. 3 is a scanning electron microscope (SEM) image of a PMP/CNT composite.
Figure 4:
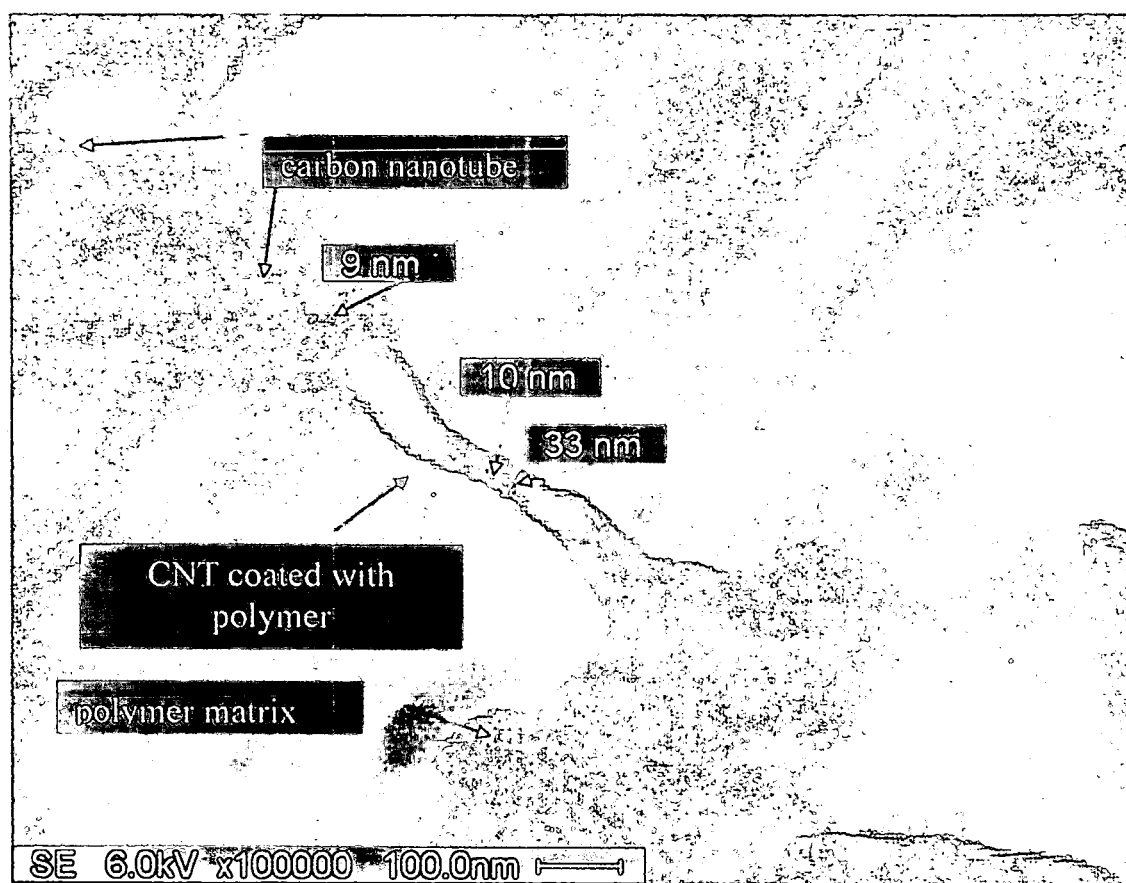
FIG. 4 is a scanning electron microscope (SEM) image of a PMP/CNT composite.
Figure 5:
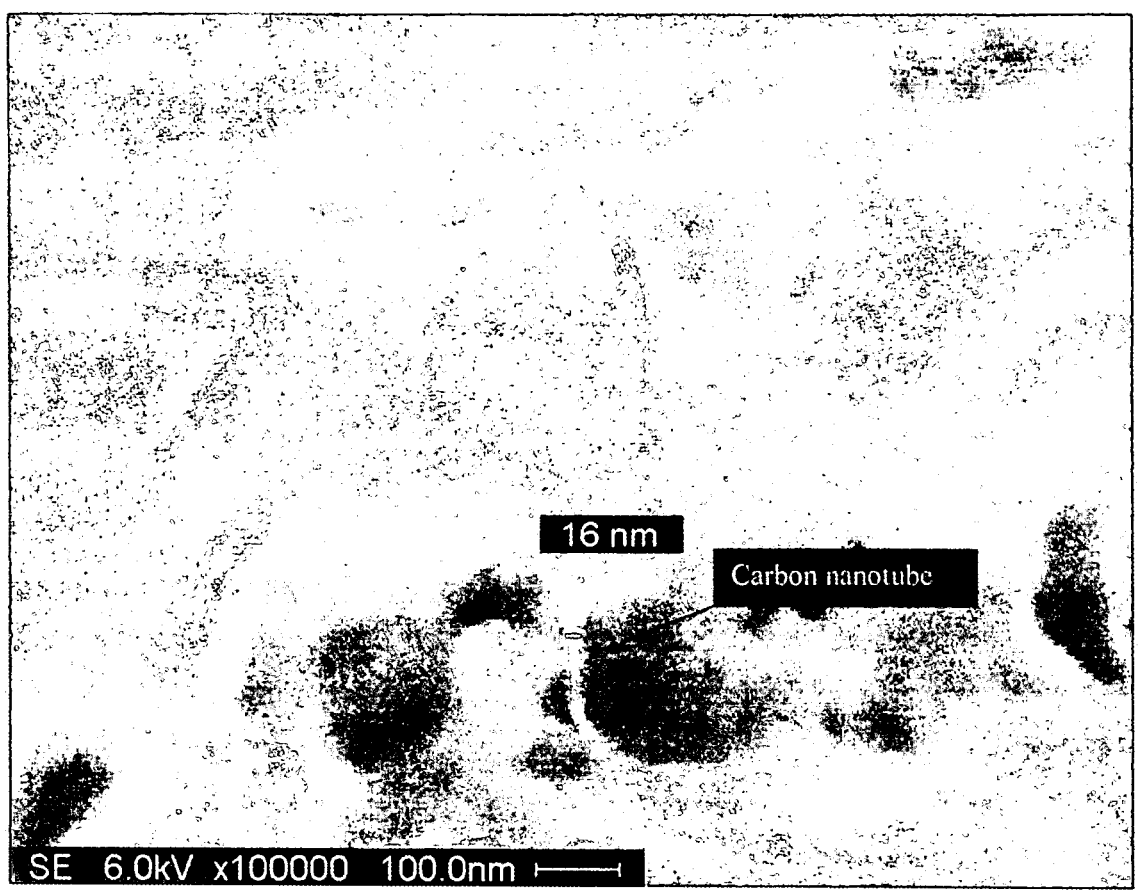
FIG. 5 is another SEM image showing that although the films are transparent and nanotube agglomerates are not visible to the naked eye, nanotubes are present within the matrix.
Figure 6:
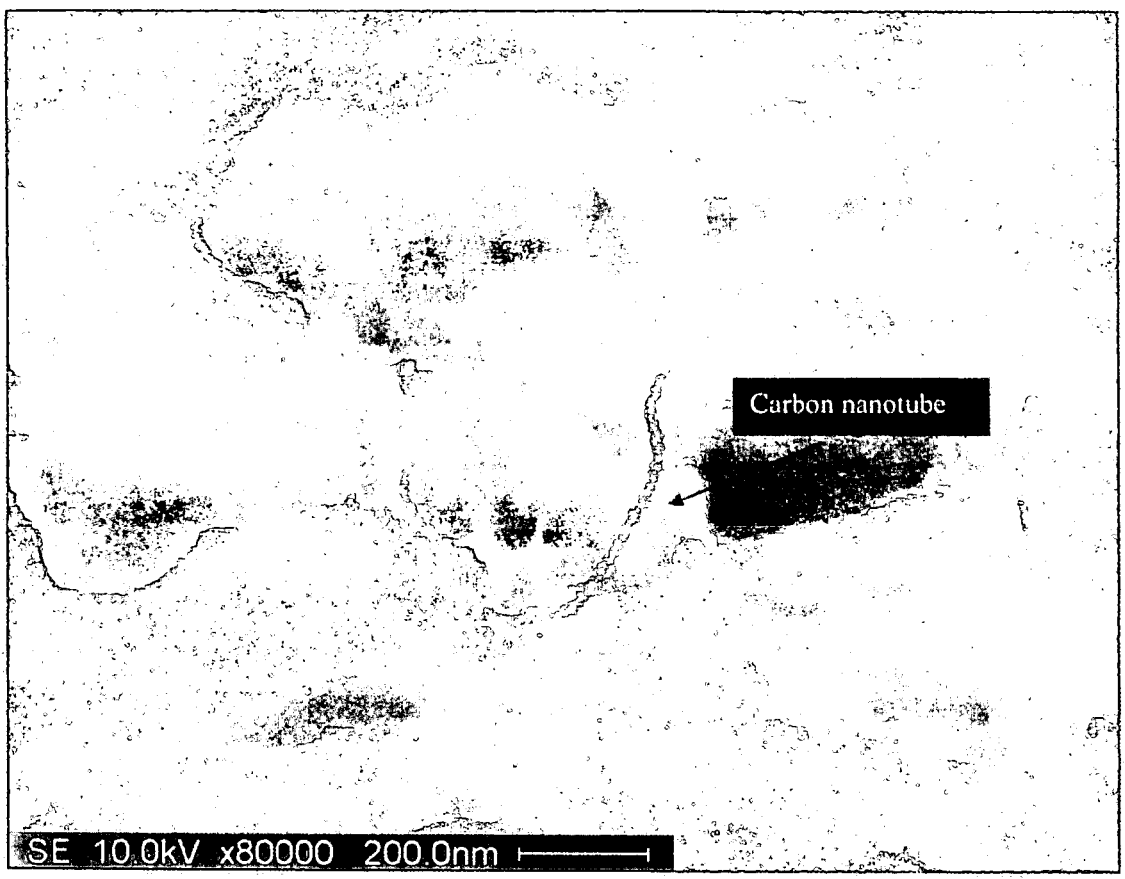
FIG. 6 is yet another SEM image showing that although the films are transparent and nanotube agglomerates are not visible to the naked eye, nanotubes are present within the matrix.

FIGS. 3 and 4 are scanning electron microscope images of the PMP/CNT composite. The image evidences the presence of a carbon nanotube coated by the polymer matrix. FIGS. 5 and 6 are more SEM images. SEM images prove that although the films are transparent and nanotube agglomerates are not visible to the naked eye, nanotubes are present within the matrix.

Carbon nanotubes in the powder form may be used instead of the buckypaper. This will allow for better yield and dispersion. Nanotube concentrations ranging form 0.10%-20% are also within the scope of this invention.

Figures 7A, 7B, 7C:
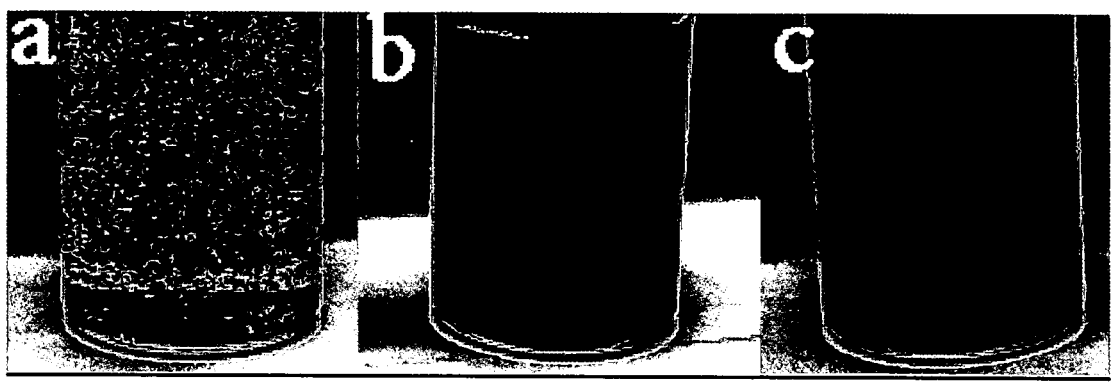
FIG. 7(a) illustrates carbon nanotubes sonicated in 1-chlorohexane. The carbon nanotubes were pretreated with DMF. The 1-chlorohexane did not dissolve PMP, nor did it effectively disperse the pretreated carbon nanotubes.
FIG. 7(b) illustrates carbon nanotubes sonicated in cyclohexyl chloride. The carbon nanotubes were pretreated with DMF.
FIG. 7(c) illustrates a uniformed mixture of cyclohexyl chloride, PMP, and carbon nanotube.

1-chlorohexane did not dissolve the polymer nor was it efficient at dispersing the nanotubes (FIG. 7(*a*)). Cyclohexyl chloride was found to create a uniformed solvent/nanotube mixture (FIG. 7(*b*)) as well as a uniformed solvent/polymer/nanotube mixture (FIG. 7(*c*)). FIG. 8(B) is an optical micrograph of the P4M1P thin film. FIG. 8(*a*) is that of the neat.

Dynamic Mechanical Analysis

PMP has three reported mechanical relaxations: the $\alpha_a$ also referred to as $\beta(\alpha_a)$ ranging from 20° C.-67° C. (Woodward et al. 1961; Miyoshi et al. 2004; Reddy et al. 1997), a broad high temperature relaxation ($\alpha_c$) ranging from 105° C.-135° C. (Lopez et al. 1992; Reddy et al. 1997; Choy et al. 1981; Miyoshi et al. 2004) and a low temperature peak ($\gamma$ or $\beta_{sc}$) was also observed at −123° C. (Woodard et al. 1961) and −140° C. (Choy et al. 1981). The low temperature relaxation ($\gamma$) was not seen in the frequency range used for this study. It is defined as the rotation of the side groups and depends on the amount of amorphous character present (Lopez et al. 1986). The $\alpha_a$ transition is the glass transition region associated with the segmental motion of the polymer main chain (Penn 1966; Choy et al. 1981). The nature of the $\alpha_c$ transition is associated with motions within the crystalline phase and is believed to be an expansion of the unit cell parameter a (Lopez et al. 1992, Penn 1986, Ranby et al. 1962).

Figure 9:
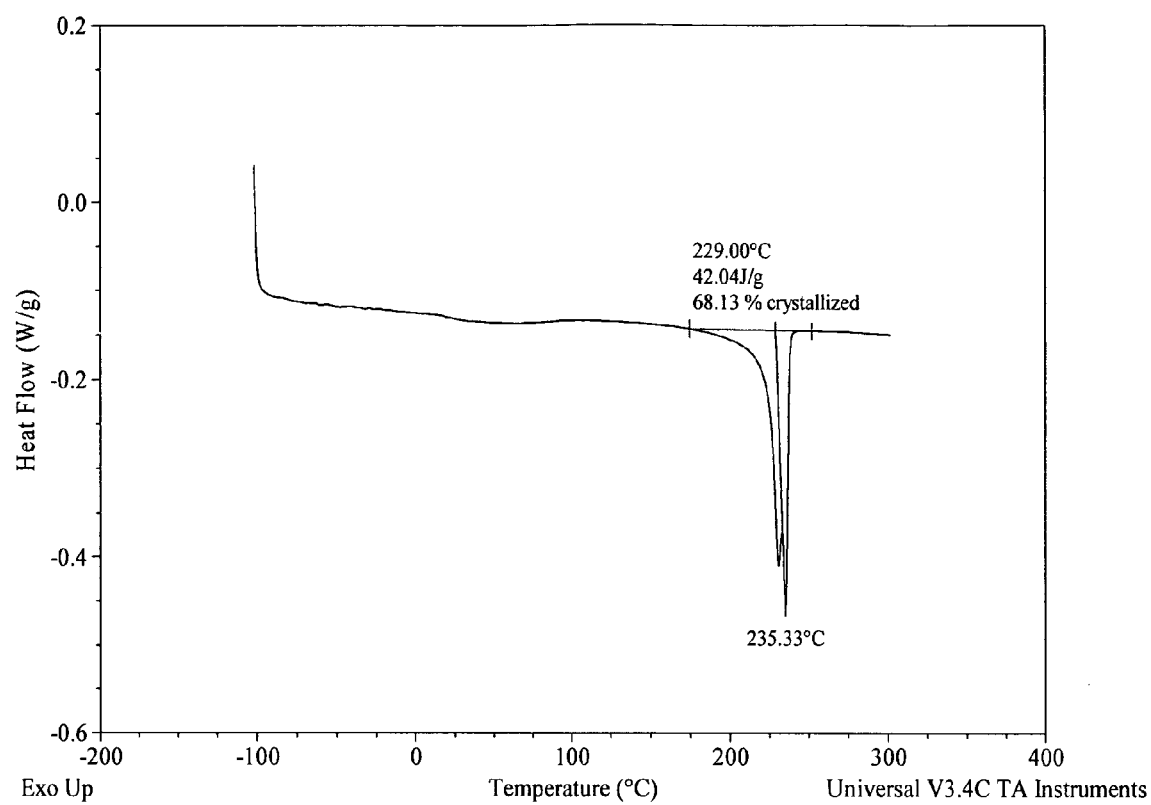
FIG. 9 illustrates DSC Plot of neat PMP.
Figure 10:
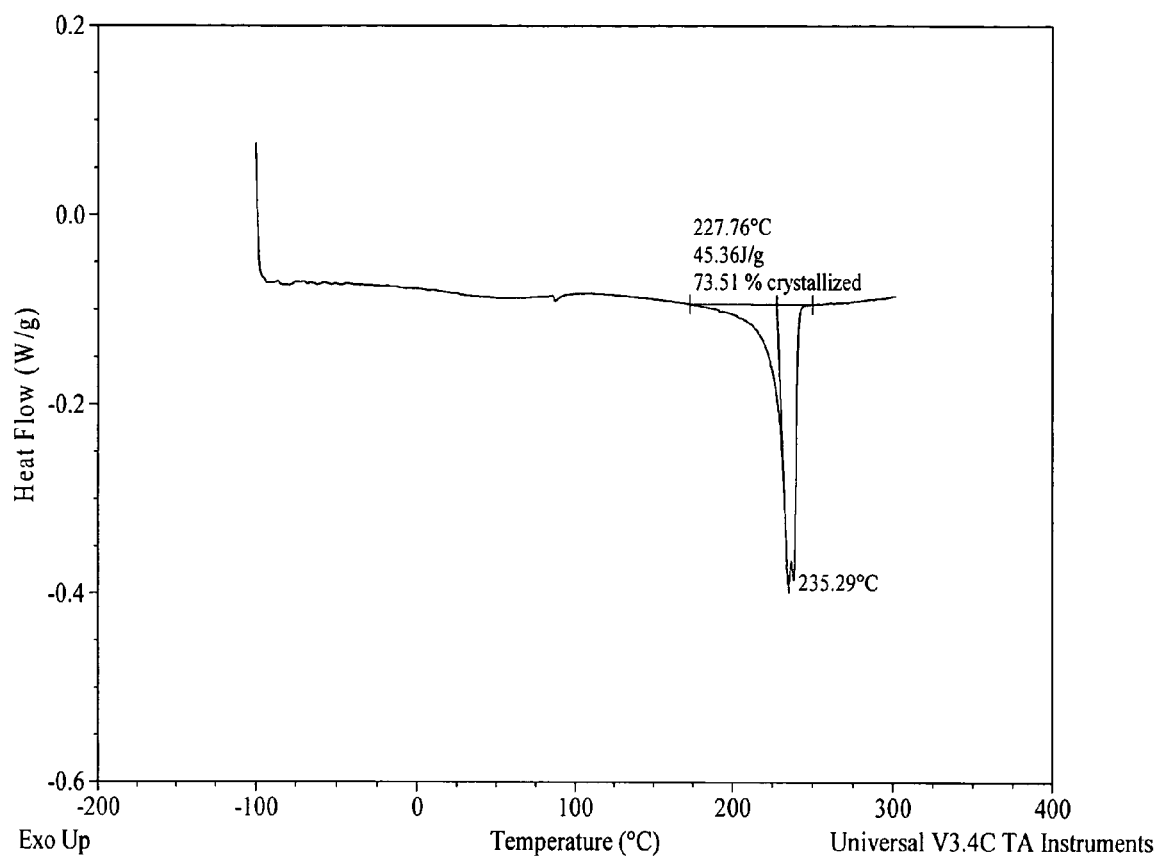
FIG. 10 illustrates DSC Plot of neat PMP/SWNT.
Figure 11:
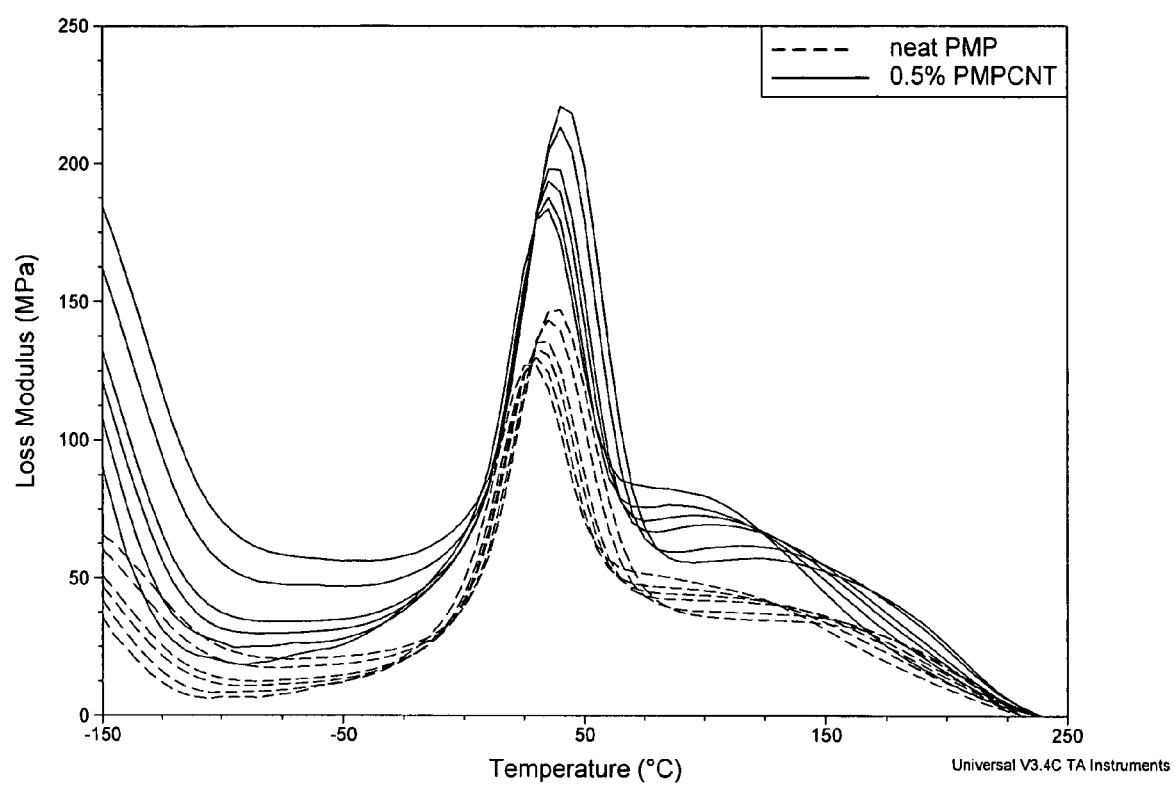
FIG. 11 illustrates Loss Modulus (E") plotted against temperature for neat PMP and PMP/SWNT.
Figure 12:
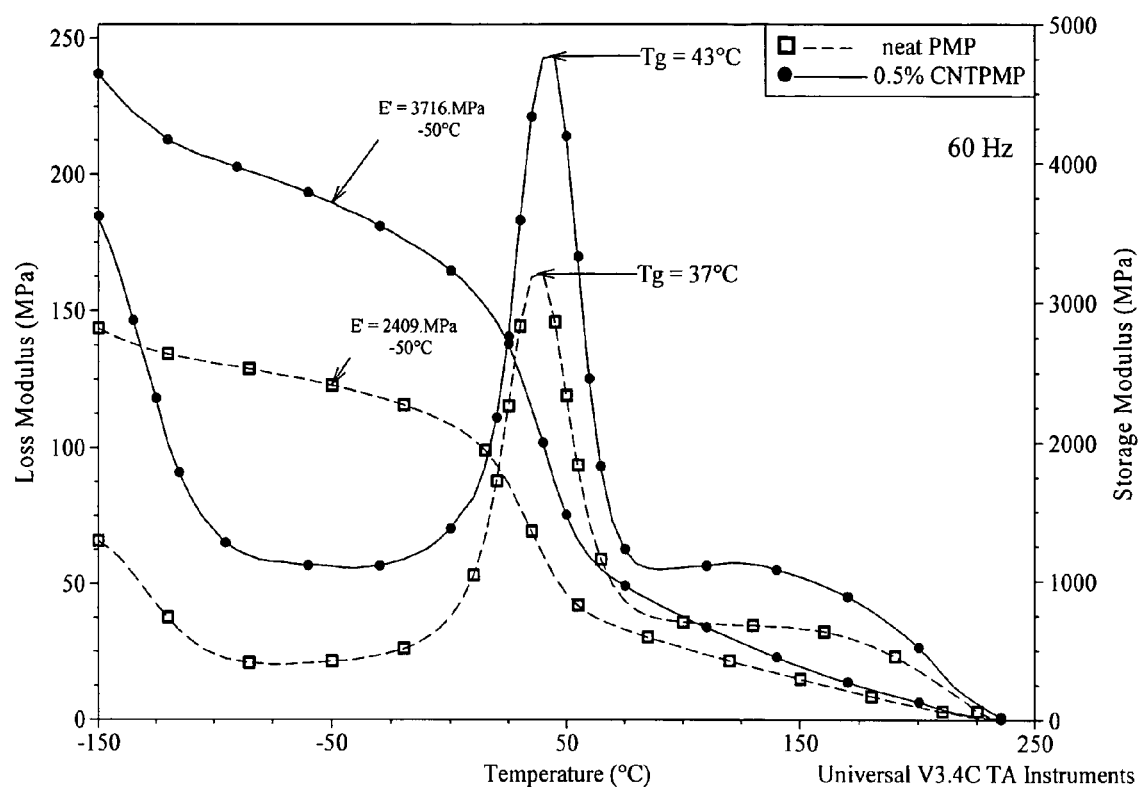
FIG. 12 illustrates DMA data at 60 Hz of E' and E".

FIG. 11 is a plot of the loss modulus (E″) plotted against temperature for the neat and composite samples from −150° C. to 250° C. and 1 Hz to 60 Hz. The loss modulus of the composite sample increases with the addition of the carbon nanotubes. The high temperature relaxation ($\alpha_c$) is more pronounced in the composite sample as compared to the neat. The percent crystallinity, as determined from DSC plots, (FIGS. 9 and 10) for the neat and composite samples was 68% and 74%, respectively. The elastic modulus (E') represents the material's stiffness. The stiffness of the composite at 60 Hz and −50° C., 25° C., and 50° C. is higher than that of the neat as indicated in Table 1, with the highest modulus existing at temperatures below the $T_g$ region (FIG. 12). Further, an increase in stiffness should correlate to an increase in the percent crystallinity of the polymer (Gedde 1999). To further support the increase in viscoelastic properties, the composite had a Vickers hardness number of 97 MPa as compared to 82 MPa for the neat.

TABLE 1

Storage Modulus (E') values at 60 Hz.

| E' (MPa) @ 60 Hz | −50° C. | 25° C. | 50° C. |
|---|---|---|---|
| Neat PMP | 2409 | 1710 | 918 |
| 0.5% PMP/CNT | 3716 | 2713 | 1494 |

The enhanced relaxation intensity of the crystalline region ($\alpha_c$) is indicative of increased interaction between the carbon nanotubes and polymer matrix. Studies have shown that carbon nanotubes can act as nucleating agents (Ryan et al. 2004; Cadek et al. 2004, Ruan et al. 2003; Bhattacharyya 2003). It was shown that uniform dispersion and good interfacial bonding between CNTs and polyethylene resulted in secondary crystal growth, thus enhancing the ductility of the composite (Ruan et al. 2003). Further, a crystalline layer formed on MWNTs, contributed to the enhanced mechanical properties of polyvinylalcohol/MWNT composites (Cadek et al. 2004).

In semi-crystalline polymers, the glass transition region is restricted by crystals and exhibit broader relaxations than in the $T_g$ region of fully amorphous polymers (Gedde 1999). Thus, glass transition temperatures are difficult to decipher in differential scanning calorimetry plots. However, DMA is a useful tool in determining these values. Moreover, being that relaxations are time, temperature and frequency dependent, $T_g$ values reported from DMA must specify the frequency in which the temperature is reported. The glass transition temperatures for the neat and composite samples taken at 60 Hz were found to be 37° C. and 43° C.

Figure 13:
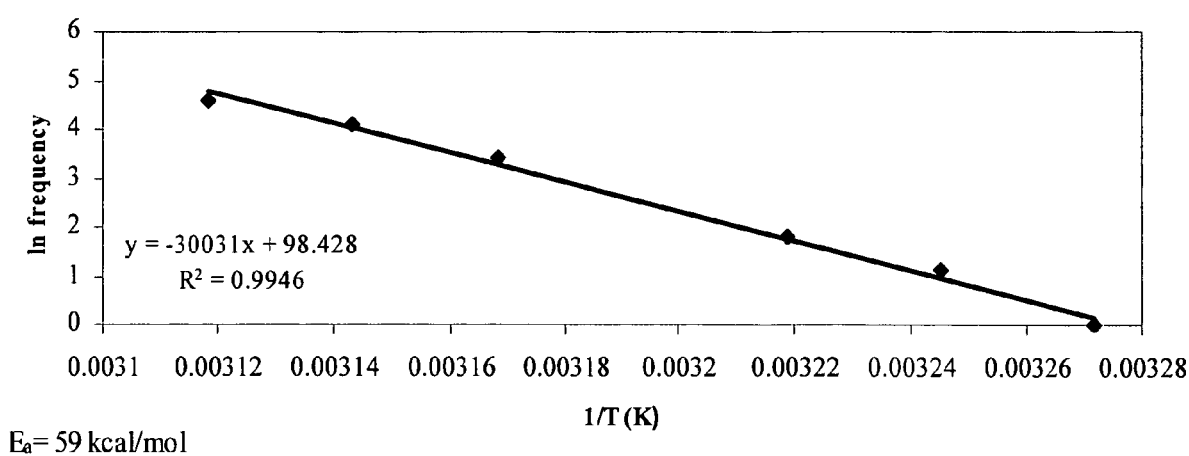
FIG. 13 illustrates Arrhenius plot for neat PMP from 1 Hz to 100 Hz.
Figure 14:
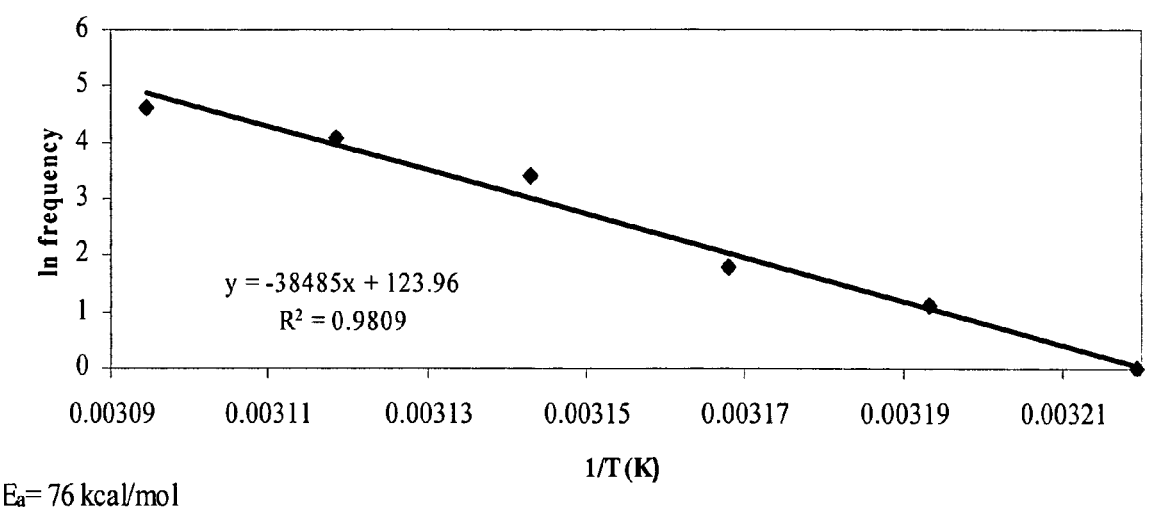
FIG. 14 illustrates an Arrhenius plot for 0.5% PMP/SWNT from 1 Hz to 100 Hz.

The maximum loss peak height obtained from DMA will shift to higher temperatures. In a narrow temperature range, the shift or frequency is linear (Gedde 1999). Temperature dependency of semi-crystalline polymers conforms to Arrhenius behavior (McCrum 1967). FIGS. 13 and 14 are Arrhenius plots of neat PMP and the composite. Activation energies were obtained by multiplying the slope of the line by the gas constant (1.987 cal/mol K). The neat had an activation energy of 59 kcal/mol with that of the composite being 76 kcal/mol. The energy needed to induce flow in the composite was higher. The reason for this increase is two-fold: (1) the presence of the nanotubes hindering chain movement and (2) the presence of a crystal layer on the CNTs, thus increasing the crystallinity in this region which in turn restricts the mobility of the amorphous region. Activation energies associated with viscous flow are large due to the cooperative behavior present in this region (Starkweather 1981). Lee and Hiltz (1984) obtained an activation energy of 106 kcal/mol and Choy et al. (1981) reported 60 kcal/mol. Activation energies vary depending on the method used for testing, thus they are only approximations.

The Williams, Landel and Ferry equation (1) accounts for curvature present in the Arrhenius plot (Gedde 1999; Starkweather 1981). In this study, the values for $C_1$, $C_2$, and the reference temperature $T_o$ ($T_g$) were obtained from a curve fitting program (Gao 1997); $a_T$ represents the shift factor or frequency and T is the given temperature. Table 2 lists the values reported by Penn (1966) and Lee and Hiltz (1984). Deviations from the universal constants are typical due to variations in the glass transition temperatures and the methods used to obtain these values (McCrum 1967).

$$\log a_T = -\frac{C_1(T - T_o)}{C_2 + (T - T_o)} \quad \text{(EQ 1)}$$

TABLE 2

WLF shift constants for poly (4-methyl-1-pentene)

| Sample | $T_o$ | $C_1$ | $C_2$ |
|---|---|---|---|
| Universal constants | — | 17.4 | 51.6 |
| Neat PMP | 32.6 | 9.90 | 56.3 |
| 0.5% PMP/CNT | 37.7 | 10.2 | 48.1 |
| Lee and Hiltz* | — | 20.7 | 37.0 |
| Penn* | 25.0 | 17.3 | 40.4 |

Figure 15:
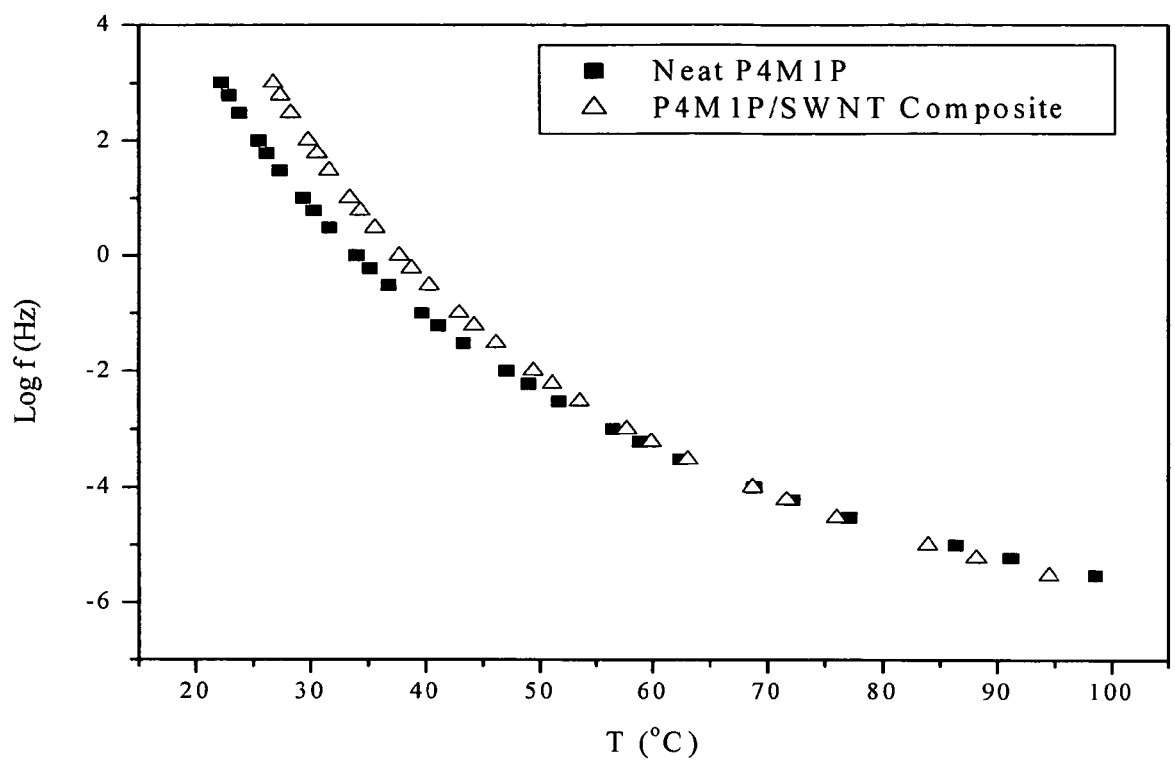
FIG. 15 illustrates a master curve of neat PMP and PMP/SWNT composite from $3 \times 10^{-6}$ Hz to 1000 Hz.
Figure 16:
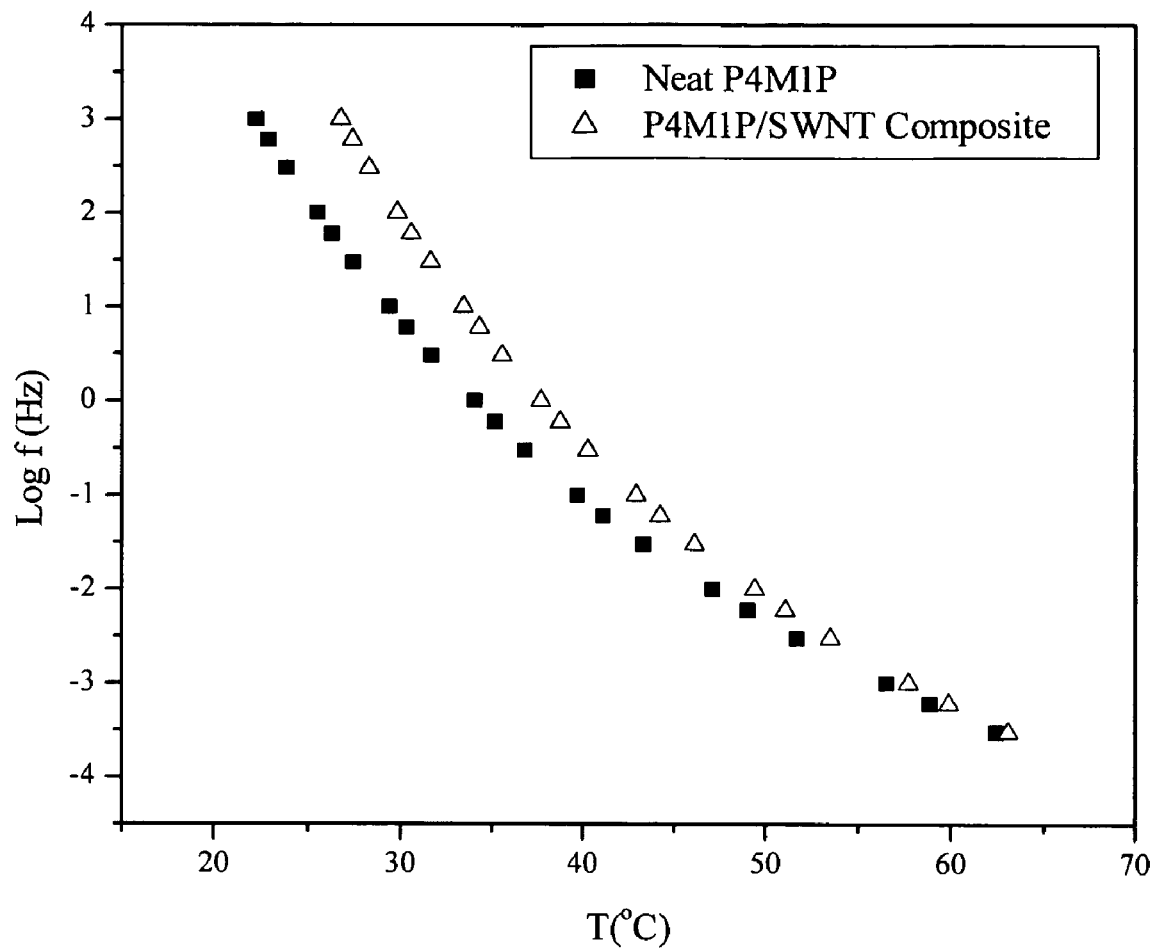
FIG. 16 illustrates master curve of reported $T_g$ region for PMP using WLF shift constants.

The WLF shift constants, $C_1$ and $C_2$, can be used to predict mechanical behavior of a polymer over a wide range of frequencies. In this study, 1 Hz, 3 Hz, 6 Hz, 10 Hz, 30 Hz, 60 Hz, and 100 Hz were used to obtain mechanical data. To further understand the behavior of PMP as a function of time and temperature over a wide range of frequencies a master curve was generated utilizing the WLF shift constants. FIG. 15 is a plot of master curves for the neat and composite samples. It is clear that over a wide range of frequencies and temperatures, PMP conforms to WLF. FIG. 16 is a plot of the glass transition region of PMP using the WLF shift constants. These results are comparable to WLF treatment of PMP previously published (Penn 1966; Lee and Hiltz 1984).

The WLF constants can also be used to calculate the fractional free volume ($f_g$) and the thermal expansion coefficient ($\alpha_f$) (Table 3) of a polymer (Aklonis et al. 1972; Emran 2000). Equations 2 and 3 were used to calculate $f_g$ and $\alpha_f$, where B is equal to 1.

$$f_g = \frac{B}{(2.303)C_1} \quad (EQ\ 2)$$

$$\alpha_f = \frac{f_g}{C_2} \quad (EQ\ 3)$$

$f_g$ defines the amount of unoccupied space between chain segments as a result of chain segment packing (Aklonis et al. 1972). Conclusions can not be made based on the calculated fractional free volume and coefficient of thermal expansion for the neat and composite sample due to the small loading of carbon nanotubes; however, it can be stated that the composite can be used in applications in which the pure polymer is desired.

TABLE 3

WLF constants and calculated fractional free volume and expansion of thermal coefficient values.

| Sample | $T_o$ | $C_1$ | $C_2$ | $f_g$ | $a_f$ |
|---|---|---|---|---|---|
| Neat PMP | 32.6 | 9.90 | 56.3 | 0.0439 | 0.779 |
| 0.5% PMP/CNT | 37.7 | 10.2 | 48.1 | 0.0430 | 0.884 |

Conclusions

Carbon nanotubes were successfully incorporated into poly(4-methyl-1-pentene). The processing technique employed was found to be effective in dispersing the nanotubes in the polymer. Further, analysis of the composite confirmed that the nanotubes did in fact serve as a good reinforcement agent for the polymer. The composite sample exhibited an increase in modulus and glass transition temperature. The crystalline region as noted in the loss modulus data was found to enhance with the addition of carbon nanotubes, indicating good interaction between the polymer-nanotube interface.

Experimental data for the composite sample was fitted to WLF parameters and found to be consistent with values obtained for neat poly (4-methyl-1-pentene) in this study and previously published results (Penn 1966; Lee and Hiltz 1984); thus characterization techniques can be extended to polymer-nanotube composites.

EXAMPLE 2

Studies Using Commercial PMP as Neat Polymer (No Nanotubes) and in USF Processed PMP/Carbon Nanotube Composites with PE Controls PMP is purchased from Phillips; PE is purchased as recommended by NASA. SWCTs are purchased from Carbon Nanotube Technologies Inc. (CNI). Neat PMP, PE and PMP composites are compression molded in a Carver hot press according to sample dimension specified by NASA. The composites are prepared by sonicating SWNT in cyclohexane at temperatures below the boiling point of the solvent. PMP is added (5% polymer to solvent by weight). Nanotube concentrations vary from 0.1 to 10% based on nanotube to polymer weight. Solutions with the lower concentrations of nanotubes are cast into films of various thickness using doctor blades. The films are dried in a vacuum over at 80° C. for 12 hours. These films are stacked and compression molded to yield samples of the appropriate thicknesses required for testing. 10% nanotube solutions are dried under vacuum for 25 hours. These are used as masterbatches and diluted with PMP in a melt mixer (Banbury mixer) to produce samples with concentrations from 0.1-5% SWNT. PE nanotube composites are prepared by melt mixing 50% SWNT with 50% PE in the Banbury. This is used as a masterbatch and diluted in the Banbury with pure PE to concentration from 0.1-5% SWNT. This procedure is repeated with PMP for comparison. PMP has the advantage of being able to undergo the sonication process described above using cyclohexane. It is expected that use of the solvent will greatly improve dispersion.

EXAMPLE 3

Studies Using Synthesized PMP and PMP Carbon Nanotube Composites

The synthesis of neat PMP polymer is a low risk experimental plan; well tested, explicit procedures are at hand (Tait, P. J. T. et al. "Polymerization of 4-Methylpentene-1 with Magnesium-Chloride-Supported Catalysts", *Advances in Polyolefins* 309 (R. B. Seymour and T. Cheng, eds. Plenum Press) (1987)). This synthesis involves the use of $MgCl_2$-supported titanium catalyst systems. The reactions are carried out in heptane or toluene solvents. Since PMP is commercially available, the reason for undertaking in-house synthesis is to take advantage of the fact that the synthesis starts out with an ultra low viscosity system, monomer in solvent. Once the in-house synthesis of neat polymer is optimized the synthesis is adapted to include the addition of carbon nanotubes-solvent systems, which have been sonicated prior to addition to the monomer catalyst system. However, carbon nanotubes may interfere with the catalyst system and impede the polymerization, or alter the stereoregularity of the polymer. All materials are available from Aldrich. The synthesis scheme used in this research is described by Tait et. al. A typical recipe is as follows:

a) Preparation of the catalyst: Dried $MgCl_2$ is treated with thionyl chloride while ball milling at $MgCl_2:SOCl_2$ mole ratios of 1.0:0.05. Ethyl benzoate, EB, is added 1 to 10 mole ration based $EB:MgCl_2$. Milling continues for 72 hours. Siloxane oil is added at 0.08 moles of silicon to 1 mole of $MgCl_2$ and the system is milled for 5 hours. Neat $TiCl_4$ is added, and the system is heated to 115° C. for 1.5 hours. The system is then filtered.

b) Polymerization: Glassware is dried at 150° C. and stored under vacuum until use. The order of addition is: solvent/catalyst slurry/alkyl aluminum (triethyl aluminum)/monomer. The polymerization proceeds for 30 hours at 10° C. Concentrations are: Ti=0.028 mmole $dm^{-3}$, Al=18 mmole $dm^{-3}$ monomer=2 mmole $dm^{-3}$, solvent=excess. Neat polymers are extracted with boiling hexane. Composites are isolated by distilling of excess solvent followed by drying them in a vacuum over at 80° C. for 12 hours. Samples are molded to appropriate dimensions using a Carver hot press.

EXAMPLE 4

Ground Testing: Brookhaven National Lab (BNL)

Dosimetry is used to characterize the uniformity of the applied GCR field, and the flux of the applied radiation field (Isodose Region). The size and uniformity of the field determines the sample size. Dosimetry of the applied field and the dose behind each shielding configuration are measured to determine the shielding efficiency. Several witness dosimeters are required for each trial to ensure consistency of the applied field from trial run to trial run. Each DOE test configuration is performed in triplicate. The three factors selected includes thickness (250 mils and 25 mils), composite concentration (no nanotubes vs. fully loaded) and resin composition (polyethylene vs. PMP).

This DOE test matrix provides an evaluation that validates the test conditions are accurate if the baseline value for shielding effectiveness established by NASA-Langley. The test matrix also examines the value of densely-packed carbon atoms for determining if the cross-sectional density of the shield has been realized. Finally the linearity of the shielding efficiency can be inferred by the thickness study (non-linearity inferring limits in stopping power or secondary radiation effects). The results will advance the understanding of material behavior and particle physics for hydrocarbon-based polymeric shields.

It should be understood that the examples and embodiments described herein are for illustrative purposes only and that various modifications or changes in light thereof will be suggested to persons skilled in the art and are to be included within the spirit and purview of this application.

We claim:

1. A method for resisting ionizing radiation comprising:
   (a) providing a device that is subjected to ionizing radiation when in use, wherein the device comprises a transparent polymer and a plurality of carbon nanotubes at least on the device's surface, wherein the carbon nanotubes are incorporated into the matrix of the polymer; and
   (b) exposing the device to ionizing radiation, whereby the device exhibits improved resistance to ionizing radiation.

2. The method according to claim 1, wherein the transparent polymer is poly(4-methyl-1-pentene).

3. The method according to claim 1, wherein the transparent polymer comprises a semicrystalline polymer with thermal stability.

4. The method according to claim 1, wherein the ionizing radiation is galactic cosmic radiation.

5. The method according to claim 1, wherein the device is molded from the polymer.

6. The method according to claim 1, wherein the device is coated with the polymer.

7. The method according to claim 1, wherein the device is a window.

8. The method according to claim 1, wherein the device is a scintillator.

9. The method according to claim 1, wherein the device is a biomedical plastic.

10. The method according to claim 1, wherein the polymer comprises organic dyes, wherein the organic dyes comprise at least one phenyl ring.

11. The method according to claim 1, wherein the device further comprises a tungsten spray coating.

12. The method according to claim 1, wherein the plurality of carbon nanotubes are single wall carbon nanotubes.

13. A method for preparing transparent composites comprising:
   (a) dissolving poly(4-methyl-1-pentene) in a first solvent at a temperature high enough to prevent the poly(4-methyl-1-pentene) from precipitating out of solution;
   (b) sonicating a plurality of carbon nanotubes in a second solvent,
   (c) mixing the dissolved poly(4-methyl-1-pentene) of step (a) with the carbon nanotube solvent of step (b); and
   (d) sonicating the mixture of step (c) for a sufficient period of time to substantively disperse the carbon nanotubes throughout the matrix of the poly(4-methyl-1-pentene), whereby a sonicated PMP/carbon nanotube composite in solvent is formed.

14. The method according to claim 13, further comprising spun coating the mixture of step (d) onto a substrate, wherein the first solvent and the second solvent are evaporated.

15. The method according to claim 13, further comprising heating the mixture of step (d) tinder a vacuum to remove the first solvent and the second solvent and molding the resulting polymer/carbon nanotube composite.

16. The method according to claim 13, wherein the first solvent or the second solvent is cyclohexane.

17. The method according to claim 14, wherein the first solvent or the second solvent is cyclohexane.

18. The method according to claim 15, wherein the first solvent or the second solvent is cyclohexane.

19. The method according to claim 13, wherein the solvent temperature in step (a) is at about 90° C.

20. The method according to claim 13, wherein the plurality of carbon nanotubes are single wall carbon nanotubes.

21. The method according to claim 15, wherein the plurality of carbon nanotubes are single wall carbon nanotubes.

22. The method according to claim 13, wherein the first solvent and the second solvent are identical.

23. A transparent composite comprising poly(4-methyl-1-pentene) and a plurality of carbon nanotubes, wherein the plurality of carbon nanotubes are substantially uniformly dispersed within the matrix of the polymer.

24. The transparent composite according to claim 23, wherein the poly(4-methyl-1-pentene) is doped with an organic dye, wherein the organic dye comprises at least one phenyl ring.

25. The transparent composite according to claim 23, wherein the concentration of the plurality of carbon nanotubes is between about 0.1% and about 10%.

26. The transparent composite according to claim 23, wherein the plurality of carbon nanotubes are single wall carbon nanotubes.

* * * * *

UNITED STATES PATENT AND TRADEMARK OFFICE
CERTIFICATE OF CORRECTION

PATENT NO. : 7,399,794 B2  
APPLICATION NO. : 11/117592  
DATED : July 15, 2008  
INVENTOR(S) : Julie P. Harmon and LaNetra M. Clayton Page 1 of 1

It is certified that error appears in the above-identified patent and that said Letters Patent is hereby corrected as shown below:

Column 1,  
Line 36, "a nucleating agents" should read --a nucleating agent--.

Column 1,  
Line 48, "the embodiment," should read --one embodiment,--.

Column 3,  
Line 45, "can be modifying" should read --can be modified--.

Column 5,  
Line 9, "20 s" should read --20s--.

Column 5,  
Line 67, "20 s." should read --20s.--.

Column 6,  
Line 34, "died" should read --dried--.

Column 7,  
Line 8, "ranging form" should read --ranging from--.

Column 8,  
Line 5, "polyvinylalcohol/MWNT" should read --polyvinyl alcohol/MWNT--.

Signed and Sealed this

Nineteenth Day of May, 2009

JOHN DOLL  
*Acting Director of the United States Patent and Trademark Office*